(12) United States Patent
Martoni

(10) Patent No.: US 11,058,097 B2
(45) Date of Patent: Jul. 13, 2021

(54) CONVEYING SYSTEM FOR SHOCK-SENSITIVE ITEMS, IN PARTICULAR EGGS

(71) Applicant: VALLI S.P.A., Galeata (IT)

(72) Inventor: Fausto Martoni, Galeata (IT)

(73) Assignee: VALLI S.P.A., Galeata (IT)

(*) Notice: Subject to any disclaimer, the term of this patent is extended or adjusted under 35 U.S.C. 154(b) by 0 days.

(21) Appl. No.: 16/644,292

(22) PCT Filed: Aug. 3, 2018

(86) PCT No.: PCT/IB2018/055869
§ 371 (c)(1),
(2) Date: Mar. 4, 2020

(87) PCT Pub. No.: WO2019/048949
PCT Pub. Date: Mar. 14, 2019

(65) Prior Publication Data
US 2021/0059221 A1  Mar. 4, 2021

(30) Foreign Application Priority Data
Sep. 6, 2017 (IT) .................... 102017000099999

(51) Int. Cl.
*A01K 31/16* (2006.01)
*B65G 17/06* (2006.01)
(Continued)

(52) U.S. Cl.
CPC .......... *A01K 31/165* (2013.01); *B65G 17/061* (2013.01); *B65G 17/18* (2013.01);
(Continued)

(58) Field of Classification Search
CPC ........ B65G 47/57; B65G 23/24; B65G 23/30; B65G 17/18; B65G 17/061;
(Continued)

(56) References Cited

U.S. PATENT DOCUMENTS 1,384,193 A * 7/1921 Hinchman ............. B65G 17/12
  198/463.6
2,710,682 A * 6/1955 Coll ..................... A01K 31/165
  198/447

(Continued)

FOREIGN PATENT DOCUMENTS

NL         8002232 A     11/1981

OTHER PUBLICATIONS

International Search Report and Written Opinion of the International Searching Authority dated Nov. 13, 2018 for International Patent Application No. PCT/IB2018/055869.

*Primary Examiner* — William R Harp
(74) *Attorney, Agent, or Firm* — Howson & Howson LLP

(57) ABSTRACT

A conveying system for shock-sensitive items, in particular eggs, comprises a plurality of conveying devices in which the items are transferred from one conveying device to another. More particularly, the items are transferred from a conveying device oriented in a substantially horizontal direction to an adjacent conveying device oriented in a substantially vertical direction, without the risk of being damaged. The advancing movement of the conveying device having a substantially horizontal orientation is not movement at constant speed but, on the contrary, it is a movement at variable speed, sometimes accelerated and sometimes decelerated, and the transfer of the conveyed item from the conveying device to the conveying device having a substantially vertical orientation takes place when the advancement speed of the conveying device having a substantially horizontal orientation is at its minimum value.

14 Claims, 3 Drawing Sheets

(51) Int. Cl.
*B65G 17/18* (2006.01)
*B65G 23/24* (2006.01)
*B65G 23/30* (2006.01)
*B65G 47/57* (2006.01)
*B65G 49/05* (2006.01)

(52) U.S. Cl.
CPC ............ *B65G 23/24* (2013.01); *B65G 23/30* (2013.01); *B65G 47/57* (2013.01); *B65G 49/05* (2013.01); *B65G 2201/0208* (2013.01); *B65G 2203/0291* (2013.01)

(58) Field of Classification Search
CPC ............ B65G 2203/0291; B65G 49/05; B65G 2201/0208; A01K 31/165
See application file for complete search history.

(56) References Cited

U.S. PATENT DOCUMENTS

| | | | |
|---|---|---|---|
| 3,626,905 A | | 12/1971 | Mombris et al. |
| 3,672,485 A | * | 6/1972 | Walters ................ A01K 31/165 198/450 |
| 3,770,107 A | * | 11/1973 | Michelbach ........... B65G 17/30 198/633 |
| 3,789,802 A | * | 2/1974 | Conley ................ A01K 31/165 119/337 |
| 3,882,686 A | * | 5/1975 | Rose ....................... F25D 25/04 62/63 |
| 4,199,051 A | * | 4/1980 | Kimberley ........... A01K 31/165 198/448 |
| 4,293,066 A | | 10/1981 | Kennedy et al. |
| 4,345,682 A | * | 8/1982 | White .................... B65G 47/57 119/337 |
| 5,002,016 A | * | 3/1991 | de Vrieze ............. A01K 31/165 119/337 |
| 5,279,254 A | | 1/1994 | Dowty |
| 7,573,567 B2 | * | 8/2009 | Hershtik ............... G06M 1/101 356/54 |
| 8,127,916 B2 | | 3/2012 | Mix |

* cited by examiner

CONVEYING SYSTEM FOR SHOCK-SENSITIVE ITEMS, IN PARTICULAR EGGS

TECHNICAL FIELD

The present invention relates to a conveying system for shock-sensitive items, in particular eggs.

More in detail, the present invention relates to a conveying system for shock-sensitive items, in particular eggs, which comprises a plurality of conveying devices and in which said items are transferred from one conveying device to another one.

BACKGROUND

Poultry farms for laying hens are known, inside which hens are housed in coops that are arranged in parallel rows and stacked on one another on a plurality of levels. The eggs laid by the hens are taken from the laying nests arranged in the coops and conveyed up to one end of said rows of coops by means of longitudinal conveyor belts which extend along said rows of coops on each level.

The eggs are transferred from said longitudinal conveyor belts to a transfer device comprising a conveyor belt, on which a plurality of individual seats aligned with one another, each adapted to receive a respective egg, are fastened and which is arranged so as to comprise an upwardly moving section and a downwardly moving section, which section are joined to each other by a deflection element. The laid eggs coming from the longitudinal conveyor belts arranged along the rows of coops are transferred to the conveyor belt of the transfer device at the upwardly moving section thereof (an egg in each individual seat) and they are conveyed upwards, up to the deflection element; then, the eggs—still received in their respective individual seats—advance along the downwardly moving section of the conveyor belt of the transfer device and, from there, they are further transferred to a transverse conveying line which transports the eggs to the subsequent treatment steps to which they have to be subjected for their packaging.

A conveying system of the type illustrated above is disclosed for example in documents FR 2030824 and NL8002232.

It is evident that the eggs being shock-sensitive are likely to be damaged while they are conveyed from the laying nests to the transverse conveying line which takes them out to the subsequent steps to which they have to be subjected for their packaging.

Therefore, solutions have been developed over time for avoiding sudden movements and shocks during transport which can cause the eggs to break or to be otherwise damaged.

The solutions developed in the past were essentially focused on the structure of the transfer device only, since it was considered that the upwardly directed path and the downwardly directed path traveled by the eggs and, above all, the passage from said upwardly directed path to said downwardly directed path were the more critical steps, during which the eggs are subject to the risk of colliding with a non-negligible speed against the walls of the seats in which they are received and, therefore, of being damaged. Document U.S. Pat. No. 8,127,916, for example, describes a conveying device in which the shape of the seats receiving the eggs is selected in such a way as to avoid sudden movements of the eggs inside said seats, namely during the passage from the upwardly moving section to the downwardly moving section of the transfer device.

However, the conveying systems developed so far have not provided any solutions to reduce or eliminate the risk of damaging eggs during the transfer from one device of the conveying system to another one.

Conversely, it has been verified that there is a non-negligible risk that the eggs are subjected to unwanted accelerations and shocks that can damage them during passage of said eggs from one conveying device to another one, and more particularly during passage from the longitudinal conveyor belts arranged along the rows of coops to the seats of the transfer device.

The main object of the present invention is therefore to provide a conveying system for eggs (and more generally for shock-sensitive items) which allows to overcome the above-mentioned drawback.

More in detail, the main object of the present invention is to provide a conveying system for eggs (and more generally for shock-sensitive items) in which said eggs can be transferred from a conveying device oriented in a substantially horizontal direction to an adjacent conveying device oriented in a substantially vertical direction (and/or vice versa) without the risk of being damaged.

This and other objects are achieved by the conveying system as claimed in the appended claims.

SUMMARY

Thanks to the fact that the advancing movement of the first conveying device or conveying device having a substantially horizontal orientation is not a movement at constant speed but, on the contrary, it is a movement at variable speed, sometimes accelerated and sometimes decelerated, the transfer of the conveyed item (egg) from said first conveying device to the second conveying device or conveying device having a substantially vertical orientation can occur when the advancing speed of said first conveying device is at its minimum value.

This arrangement allows to transfer said item from said first conveying device to said second conveying device as smoothly as possible, thus suppressing—or at least minimizing—the risk of shocks and consequent damages to the transferred item.

In a preferred embodiment of the invention, in order to synchronize the advancing movement of the first conveying device with the transfer of the conveyed item to the second conveying device, a motion transmission system is provided between said first and said second conveying devices and motion is transmitted from said second conveying device to said first conveying device.

Said motion transmission system comprises a motion transmission element which is configured to transform the motion at constant speed of the second conveying device into an accelerated and decelerated motion of said first conveying device.

In a preferred embodiment of the invention, said motion transmission element consists of a cam wheel, comprising one or more cam profiles: thanks to the provision of said cam profiles, the motion at constant speed transmitted by the second conveying device to the cam wheel is transformed into an accelerated and decelerated output motion transmitted from the cam wheel to the first conveying device.

For transmitting motion from the cam wheel to the first conveying device, the motion transmission system may comprise an arrangement of belts and toothed gears or a flexible shaft or a connecting rod—crank device or any other similar systems known to the person skilled in the art.

In a preferred embodiment of the invention, an analogous configuration may be provided between the downwardly moving section of the second conveying device and the third conveying device or a further conveying device having a horizontal orientation.

In this way, also the transfer of the conveyed item from said second conveying device to said third conveying device takes place as smoothly as possible, thus suppressing—or at least minimizing—the risk of shocks and consequent damages to the transferred item.

In a preferred embodiment of the invention, at said third conveying device, the second conveying device is provided with a discharging device comprising one or more plate elements which are arranged parallel to the downwardly moving section of the second conveying device and are pivotable about an axis which is substantially perpendicular to the plane in which the third conveying device lies, so that they can switch from a resting position or non-rotated position to a working position or rotated position.

If a foreign object is loaded by mistake on the second conveying device and transferred from said second conveying device to the third conveying device, the plate elements of the discharging device can rotate from the working position to a position in which they allow said foreign object to be removed from the third conveying device, and then they can move back to the working position thanks to the action of a return spring.

BRIEF DESCRIPTION OF THE DRAWINGS

Further features and advantages will become more evident from the following detailed description of a preferred embodiment of the invention, given by way of non-limiting example, with reference to the attached drawings in which:

FIG. 2b is a cross-sectional view of FIG. 2a;

DETAILED DESCRIPTION OF AN EMBODIMENT

In the following description, a preferred embodiment of the invention is described with reference to the transport of eggs. However, this embodiment must not be understood in a limiting sense and the invention can also be applied to the transport of similar shock-sensitive items.

Figure 1:
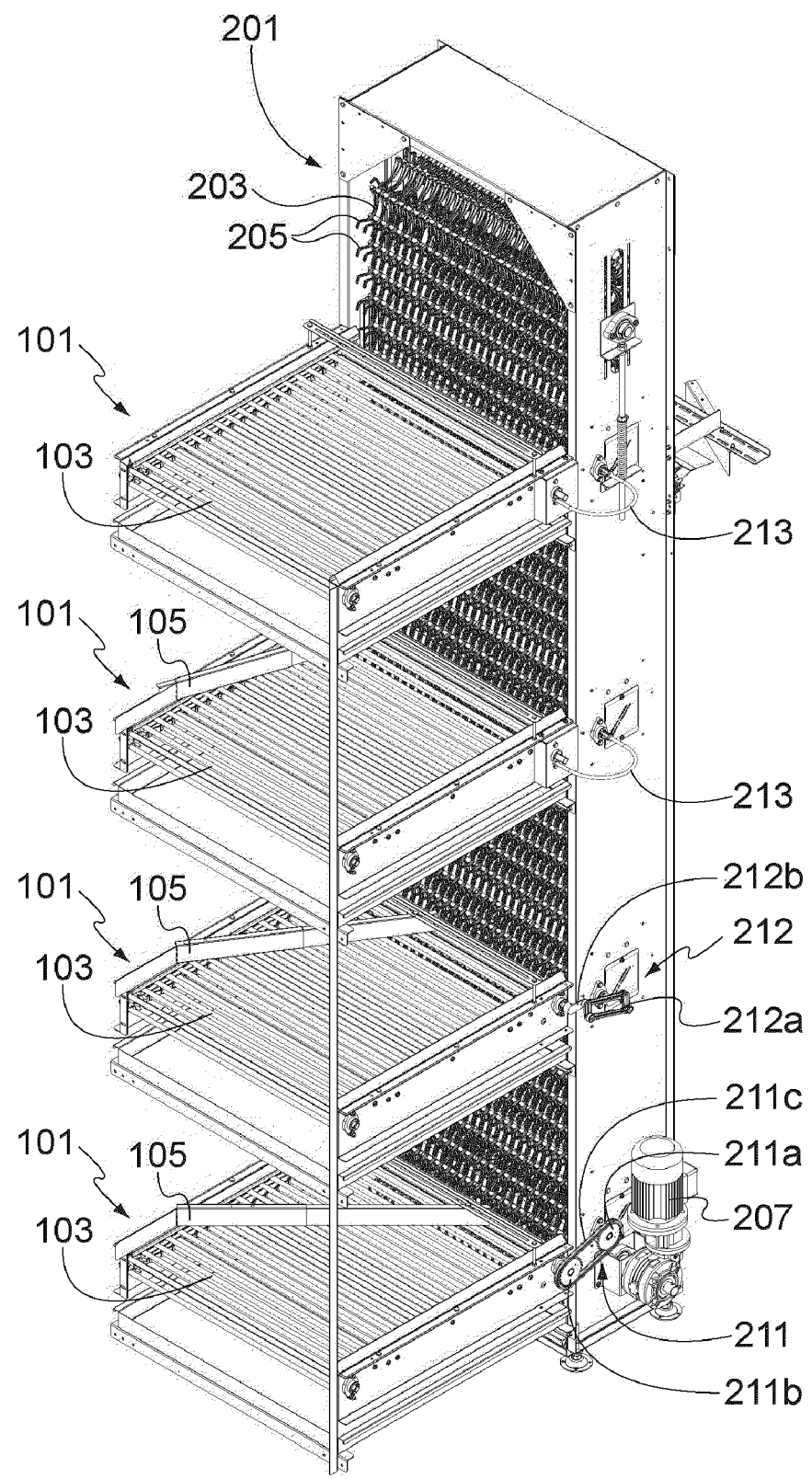
FIG. 1 is a schematic perspective view of the conveying system according to the invention.

With reference to FIG. 1, an egg conveying system 1 is schematically shown.

Said conveying system comprises a plurality of first conveying devices 101. Each of said first conveying devices 101 has a substantially horizontal orientation, i.e. an orientation which is parallel to the ground and to the supporting surface on which the conveying system 1 rests, and comprises one or more conveyor belts 103.

The conveying devices 101 can be arranged parallel to and aligned with each other, at different heights from the ground, which substantially correspond to the heights of the different rows of coops in which the laying hens are housed.

The conveyor belt 103 of each first conveying device 101 is configured to receive the eggs from a corresponding longitudinal conveyor belt (not shown in FIG. 1) arranged along a corresponding row of coops. In other words, a first end or proximal end of said conveyor belt 103 is disposed adjacent to and facing the end of the corresponding longitudinal conveyor belt, so that the eggs laid and transferred from the laying nests to said longitudinal conveyor belt are transferred from said longitudinal conveyor belt to the conveyor belt 103 of the first conveying device 101.

In general, the longitudinal conveyor belts arranged along the coops have a width which is slightly greater than the width of the eggs to be transported, while the conveyor belt 103 of the first conveying device 101 has a width considerably greater than the width of said eggs to be conveyed, for reasons that will be clarified below.

Moreover, in general, said conveyor belt 103 of said first conveying device 101 is made in the form of a bar-type conveyor belt.

Figure 2A:
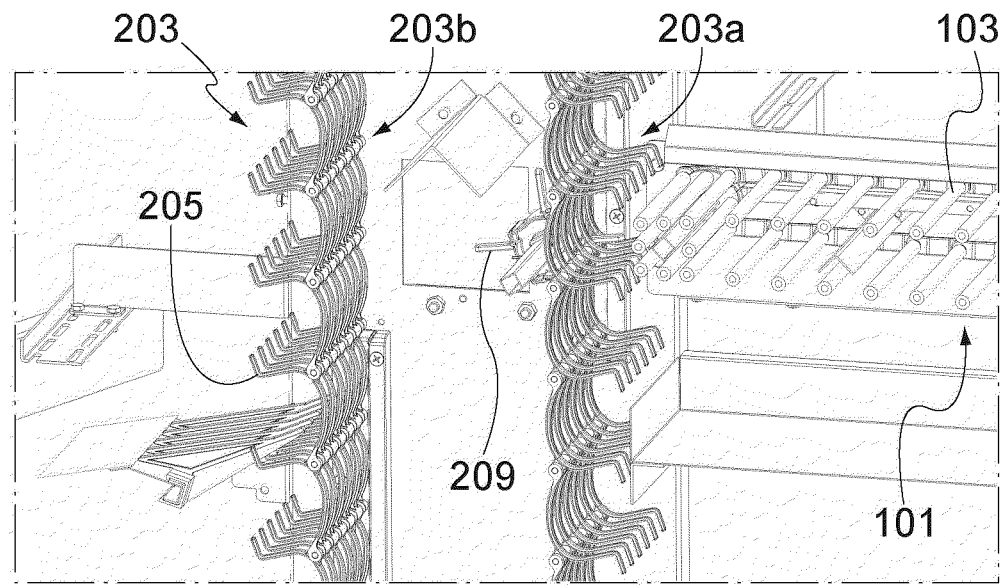
FIG. 2a is a schematic perspective view, from a different point of view, of a detail of the conveying system of FIG. 1, which detail relates to the transfer from the first conveying device to the second conveying device.
Figure 2B:
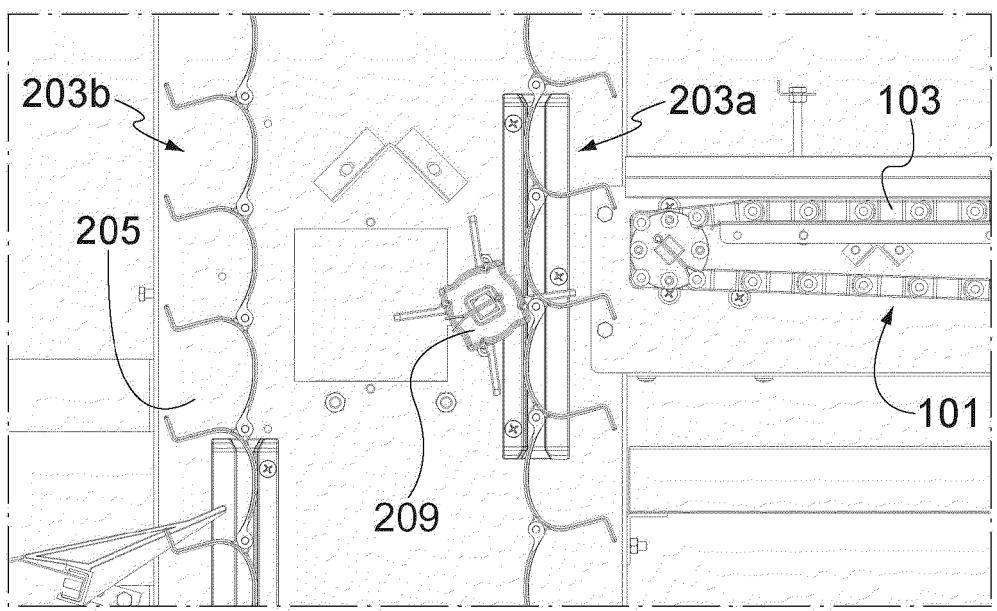

The conveying system 1 further comprises a second conveying device 201 which comprises one or more conveyor belts 203 and which, as better shown in FIGS. 2a and 2b, has a first section 203a which is oriented in a substantially vertical direction, i.e. in a direction perpendicular to the ground and to the supporting surface on which the conveying system 1 rests, and along which the conveyor belt advances in an upward direction (upwardly moving section 203a), and a second section 203b which is oriented in a substantially vertical direction and along which the conveyor belt 203 advances in downward direction (downwardly moving section 203b).

The conveyor belt 203 of the second conveying device 201 preferably has a width substantially equal to the width of the conveyor belt 103 of the first conveying device 101.

The conveyor belt 203 of the second conveying device 201 comprises a plurality of rows of seats 205, wherein each row extends in a direction transverse to the longitudinal axis of said conveyor belt 203, preferably over the entire width of said conveyor belt 203. Each seat 205 is sized to accommodate a single egg.

It should be noted that in the shown embodiment the rows of seats 205, concatenated with one another, form the structure itself of the conveyor belt 203 of the second conveying device 201; however, it is also possible to provide that said conveyor belt has its own structure and that the seats are fastened thereto, for example by welding, gluing or the like.

The second transport device 201 is arranged in such a way that the upwardly moving section 203a of the conveyor belt 203 is facing and aligned with the second end or distal end of the conveyor belt 103 of the first conveying device 101, so that the eggs can be transferred from said conveyor belt 103 of said first conveying device 101 to the seats 205 of the conveyor belt 203 of the second conveying device 201.

In this respect, it should be noted that each of the conveying devices 101 shown in the Figure is provided with a baffle 105 which is arranged on the respective conveyor belt 103 and has a different orientation. Thanks to the provision of the baffles 105, the eggs coming from the coops of each level will be arranged on the conveyor belt 103 of the respective first conveying device 101 in a certain position along the width of said conveyor belt 103, which will be different from the positions of the eggs coming from the coops of the other levels. Thanks to this arrangement it is impossible that an egg coming from a coop of a higher level (hence from a higher first conveying device 101) is directed to occupy a seat 205 of the second transport device 201 already occupied by an egg coming from a cage of a lower level (hence from a lower first conveying device 101). It is evident that for this purpose the width of the conveyor belts 103 of the first conveying devices 101—and correspondingly the width of the conveyor belt 203 of the second conveying device 201—must be considerably greater than the width of the eggs to be transported.

More particularly, the greater the number of the first conveying devices 101 is, the greater must be the width of the conveyor belts 103.

Most particularly, the width of said conveyor belts must be equal to or greater than the product of the width of the conveyed eggs and the number of first conveying devices 101.

Once the eggs have been transferred to the seats 205 of the second conveying device 201, they are conveyed upwards up to the top of the upwardly moving section 203a of the conveyor belt 203 and then along a deflection element arranged at the top of said upwardly moving section 203 and from said deflection element along the downwardly moving section 203b of said conveyor belt.

The seats 205 are shaped so as to continuously support the eggs contained therein along the upwardly moving section 203a of the conveyor belt 203 of the second conveying device 201, during the transfer along the deflection element and along the downwardly moving section 203b of said conveyor belt 203 of said second conveying device 201.

A third conveying device (not shown in FIG. 1), having a substantially horizontal orientation, i.e. an orientation parallel to the ground and to the supporting surface on which the conveying system 1 rests, and comprising one or more conveyor belts, is arranged so that the downwardly moving section 203b of the conveyor belt 203 of the second conveying device 201 is facing and aligned with said third conveying device, so that the eggs can be transferred from said conveyor belt 203 of said second conveying device 201 to the conveyor belt of the third conveying device.

Said third conveying device carries the eggs to the subsequent treatment steps to which they have to be subjected for packaging.

According to the invention, the conveying system 1 is designed so as to avoid the risk of shocks that could damage the eggs during the transfer from one of the conveying devices forming said conveying system to another one, and more particularly during the transfer from the first conveying device(s) 101 to the second conveying device 201.

To this purpose, while the conveyor belt 203 of the second conveying device 201 advances at constant speed, the conveyor belt 103 of the first conveying device 101 advances at variable speed, namely it advances with a speed alternately increasing from a minimum value to a maximum value and decreasing from said maximum value to said minimum value.

Thanks to this arrangement, the speed of said conveyor belt 103 of said first conveying device 101 can be controlled in such a way that the transfer of the eggs from said conveyor belt 103 of said first conveying device 101 to the conveyor belt 203 of the second conveying device 201 takes place when said conveyor belt 103 of said first conveying device 101 is at its minimum speed.

Such arrangement guarantees that the eggs are transferred as smoothly as possible, without any shocks at considerable speeds that could damage them.

In a possible embodiment of the invention, each of the conveyor belt 203 of the second conveying device 201 and the conveyor belt 103 of the first conveying device 101 may be provided with its own driving and motion transmission system and they can be controlled independently from each other for achieving the desired synchronization.

However, in the embodiment shown in the Figures, the synchronization between the first conveying device and the second conveying device is advantageously ensured by the fact that only the conveyor belt 203 of the second conveying device 201 is provided with a driving system (the geared motor 207 visible in FIG. 1) and a motion transmission system is provided between the conveyor belt 203 of the second conveying device 201 and the conveyor belt 103 of the first conveying device 101, said motion transmission system comprising a motion transmission element which is configured to transform the motion at constant speed of the conveyor belt 203 of the second conveying device 201 into an accelerated and decelerated motion of the conveyor belt 103 of the first conveying device 101.

With reference to FIGS. 2a and 2b, a detail of the conveying system 1 is shown, which detail, indeed, relates to the transfer of the eggs from the first conveying device 101 to the second conveying device 201 and to the motion transmission system from said second conveying device to said first conveying device.

The conveyor belt 203 of the second conveying device 201, during its upward movement along the upwardly moving section 203a, transmits its motion to a cam wheel 209, which is mounted on the frame of said second conveying device 201, substantially at the same height as a corresponding first conveying device 101, and which comprises one or more cam profiles along its periphery.

The motion at constant speed of the conveyor belt 203 of the second transport device 201 is transformed into a rotary motion of the cam wheel 209 about its axis. However, thanks to the presence of the cam profiles, said rotary motion will not have a constant speed, but, on the contrary, it will have a variable speed, increasing from a minimum value up to a maximum value and then decreasing from said maximum value to said minimum value.

Referring back to FIG. 1, it can be seen that the motion of the output shaft of the cam wheel 209 is transmitted to the conveyor belt 103 of the first conveying device 101.

According to a first possible variant, the motion transmission system comprises a group of toothed gears 211 which comprises a first toothed gear 211a mounted on the output shaft of the cam wheel 209 and integral therewith, a second toothed gear 211b mounted on the return roller of the conveyor belt 103 of the first conveying device 101 and integral therewith and a belt or chain 211c arranged between said first and second toothed gears.

According to a second possible variant, the motion transmission system comprises a flexible shaft 213 which is arranged between the output shaft of the cam wheel 209 and the return roller of the conveyor belt 103 of the first conveying device 101.

According to a third possible variant, the motion transmission system comprises a connecting rod—crank assembly 212 which comprises a connecting rod 212a mounted on the output shaft of the cam wheel 209 and integral therewith and a crank 212b mounted on the return roller of the conveyor belt 103 of the first conveying device 101 and integral therewith.

It is evident that further variants within the reach of the person skilled in the art are possible, too.

Thanks to the above-described motion transmission system, it is possible to synchronize the movement of the conveyor belt 203 of the second conveying device 201 and the movement of the conveyor belt 103 of the first conveying device 101 so that the speed of said conveyor belt 103 of said first conveying device 101, when the upward motion of the conveyor belt 203 of the second transport device 201 brings a row of seats 205 into alignment with said conveyor belt 103 of said first conveying device 101 and makes it ready to receive the eggs present on said conveyor belt, is at its minimum value.

In this way, the transfer of the eggs from said first conveying device 101 to said second conveying device takes place without risk of damaging said eggs.

According to a preferred embodiment of the invention, a similar motion transmission system may be provided between the downwardly moving section 203b of the conveyor belt 203 of the second conveying device and the third conveying device.

In this case, a further cam wheel will be mounted on the frame of the second conveying device 201 along the downwardly moving section 203b of the conveyor belt 203, substantially at the same height as the third conveying device. During its descending movement, the conveyor belt 203 of the second conveying device 201 will transmit its motion to said further cam wheel; due to the cam profiles of said further cam wheel, the motion at constant speed of the conveyor belt 203 of the second conveying device 201 will be transformed into a rotary motion of said further cam wheel having a variable speed, increasing from a minimum value up to a maximum value and then decreasing from said maximum value to said minimum value. The motion can then be transmitted from said further cam wheel to the third conveying device so that said third conveying device moves at its minimum speed when an egg is released from a seat 205 of the second conveying device onto the conveyor belt of said third conveying device.

In this way, the transfer from the second conveying device to the third conveying device will also take place as smoothly as possible.

Still with reference to FIGS. 2a and 2b, the shape of the seats 205 of the second conveying device 201 can be appreciated.

Said seats 205 are arranged in rows and each seat is concatenated to a seat of the preceding row and to a seat of the following row.

Each seat 205 has substantially a "L"-shape, with a longer leg substantially parallel to the advancing direction of the second conveying device 201 and a shorter leg substantially perpendicular to said longer leg. The longer legs of the seats 205 form the structure of the conveyor belt 203 of the second conveying device 201. The shorter legs of said seats constitute the supporting surfaces which support the eggs during movement along the upwardly moving section and along the downwardly moving section of said conveying device.

In detail, along the upwardly moving section 203a, the egg will rest on the upper face of the lower leg of its "L"-shaped seat; at the deflection element, the egg will roll over the surface of the longer leg of its "L"-shaped seat; and along the downwardly moving section 203b, the egg will rest on the lower face of the shorter leg of the "L"-shaped seat of the preceding row.

For holding the egg along the upwardly moving section, the upper face of the shorter leg of the "L"-shaped seat is made with a concave shape. As a result, in the downwardly moving section, the egg will rest on a convex surface; for preventing it from falling, the shorter leg of the "L"-shaped seat ends with an end portion which is bent so as to be upwardly oriented when the seat is in the downwardly moving section 203b of the second conveyor device 201.

Figure 3:
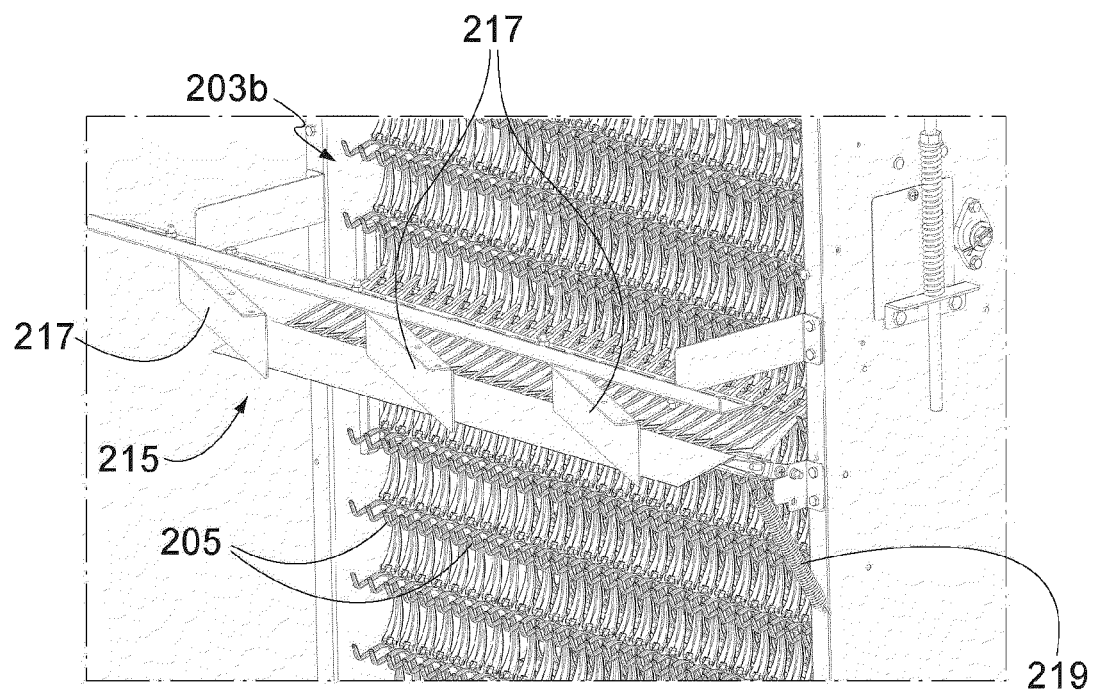
FIG. 3 is a schematic perspective view, from a further point of view, of a further detail of the conveying system of FIG. 1, which further detail relates to the transfer from the second conveying device to the third conveying device.

Referring now to FIG. 3, a detail of the conveying system 1 relating to a discharging device 215 provided at the transfer from the second conveying device 201 to the third conveying device (not shown) is illustrated.

Said discharging device 215 in the normal, working position has the function of transferring the eggs to the third conveying device, but in case a foreign object has been loaded by mistake on the conveying system, it can rotate so as to expel said foreign object, without damaging the conveyor belt, and then rotate back to the normal, working position.

Said discharging device 215 comprises one or more plate elements 217 which are arranged parallel to the downwardly moving section 203b of the conveyor belt 203 of the second conveying device 201 and are pivotable about an axis which is substantially perpendicular to the plane in which the third conveying device lies, said plate elements being held in the normal, working position—in which they contribute to the transfer of the eggs—by a return spring 219.

In the case of passage of a foreign object, said plate elements 207 can rotate for expelling said foreign object and then they can be brought back to the normal, working position by the return spring 219.

From the above description it will be evident to the person skilled in the art that the invention achieves the object set forth above, as it ensures that the transfer of eggs from a conveying device of the conveying system to another one takes place without the risk of damaging said eggs.

It will also be evident to the person skilled in the art that the invention is not limited to the embodiment described above and several modifications and variants are possible within the scope defined by the appended claims.

The invention claimed is:

1. A conveying system for shock-sensitive items, the conveying system being of the kind comprising at least one first conveying device, having a substantially horizontal orientation, and a second conveying device, having at least a first, upwardly moving section which has a substantially vertical orientation and along which the items are advanced in an upward direction, wherein the second conveying device comprises a plurality of seats intended to receive the items, wherein the second conveying device is arranged so that the upwardly moving section faces an end of the first conveying device and is aligned with the first conveying device, whereby the items can be transferred from the first conveying device to the seats of the second conveying device, and wherein, during normal operation of the conveying system with the items being conveyed on the first and second conveying devices, the second conveying device is configured to advance at constant speed and the first conveying device is configured to advance at a variable speed, which alternately and repeatedly increases from a minimum value to a maximum value and decreases from the maximum value to the minimum value.

2. The conveying system according to claim 1, wherein a motion transmission system is provided between the second conveying device and the first conveying device for transmitting motion from the second conveying device to the first conveying device and wherein the motion transmission system comprises a motion transmission element, which is arranged for converting the motion at constant speed of the second conveying device into a motion at variable speed, which alternately increases from a minimum value to a maximum value and decreases from the maximum value to the minimum value, and motion transmission means for transmitting the motion at variable speed to the first conveying device.

3. The conveying system according to claim 2, wherein the motion transmission element is a cam wheel having one or more cam profiles along its periphery.

4. The conveying system according to claim 2, wherein the motion transmission means comprise a geared wheel assembly.

5. The conveying system according to claim 2, wherein the motion transmission means comprise a flexible shaft.

6. The conveying system according to claim 2, wherein the motion transmission means comprise a connecting rod—crank assembly.

7. The conveying system according to claim 1, wherein the second conveying device further comprises a second, downwardly moving section which has a substantially vertical orientation and along which the items are advanced in a downward direction, and wherein the conveying system comprises a third conveying device, which has a substantially horizontal orientation and which is arranged so that that the downwardly moving section of the second conveying device faces the third conveying device and is aligned with the third conveying device, whereby the items can be transferred from the seats of the second conveying device to the third conveying device.

8. The conveying system according to claim 7, wherein the third conveying device advances at a variable speed, which alternately increases from a minimum value to a maximum value and decreases from the maximum value to the minimum value.

9. The conveying system according to claim 8, wherein a motion transmission system is provided between the second conveying device and the third conveying device for transmitting motion from the second conveying device to the third conveying device, and wherein the motion transmission system comprises a motion transmission element, which is arranged for converting the motion at constant speed of the second conveying device into a motion at variable speed, which alternately increases from a minimum value to a maximum value and decreases from the maximum value to the minimum value, and motion transmission means for transmitting the motion at variable speed to the third conveying device.

10. The conveying system according to claim 7, wherein the conveying system comprises, along the downwardly moving section of the second conveying device, at the third conveying device, a discharging device comprising one or more plate elements, which are arranged parallel to the downwardly moving section of the second conveying device and are pivotable about an axis which is substantially perpendicular to the plane in which the third conveying device lies.

11. The conveying system according to claim 1, in which the first conveying device comprises one or more conveyor belt(s).

12. The conveying system according to claim 11, wherein the conveyor belt(s) of the first conveying device is/are made as bar-type conveyor belts.

13. The conveying system according to claim 1, wherein the variable speed of the first conveying device is at the minimum value each time seats of the second conveying device are aligned with the first conveying device in a position for transfer of items from the first conveying device to the seats of the second conveying device.

14. The conveying system according to claim 1, wherein the conveying system is an egg conveying system.

* * * * *